J. HART.
DIRIGIBLE HEADLIGHT.
APPLICATION FILED MAR. 25, 1918.
1,277,577.
Patented Sept. 3, 1918.
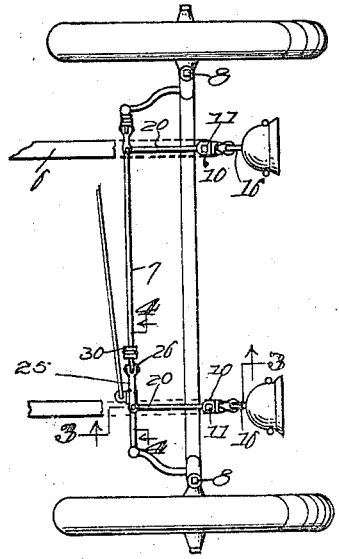
Fig. 1.
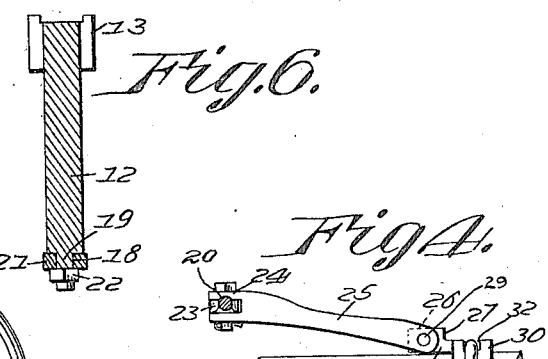
Fig. 3.
Fig. 6.
Fig. 4.
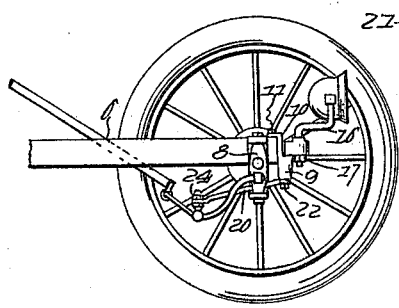
Fig. 2.
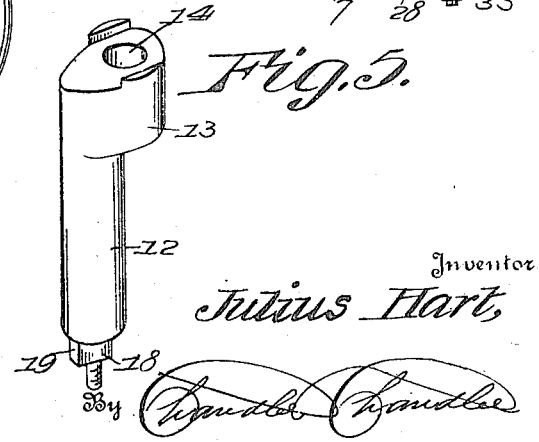
Fig. 5.
Fig. 7.
Inventor
Julius Hart,
Witnesses:
By
Attorneys

UNITED STATES PATENT OFFICE.

JULIUS HART, OF ASHLAND, OREGON.

DIRIGIBLE HEADLIGHT.

1,277,577. Specification of Letters Patent. Patented Sept. 3, 1918.

Application filed March 25, 1918. Serial No. 224,578.

*To all whom it may concern:*

Be it known that I, JULIUS HART, a citizen of the United States, residing at Ashland, in the county of Jackson, State of Oregon, have invented certain new and useful Improvements in Dirigible Headlights; and I do hereby declare the following to be a full, clear, and exact description of the invention, such as will enable others skilled in the art to which it appertains to make and use the same.

This invention is an improvement in headlights and has particular reference to a dirigible headlight or lamp for automobiles.

An object of the invention is to provide an improved mechanism of simple, inexpensive and durable construction for turning either one or both of the headlights of a motor vehicle when the steering apparatus of the latter is operated so that the path of the machine will, at all times, be illuminated.

The inventive idea involved is capable of receiving a variety of mechanical expressions one of which, for the purpose of illustrating the invention, is shown in the accompanying drawing wherein:—

Figure 1 is a top plan view of the mechanism showing the same applied to the frame of an automobile.

Fig. 2 is a side elevation thereof.

Fig. 3 is an enlarged longitudinal section on the line 3—3 of Fig. 1.

Fig. 4 is a section on the line 4—4 of Fig. 1.

Fig. 5 is a perspective view of the spindle for supporting one of the headlights.

Fig. 6 is a section on the line 6—6 of Fig. 3.

Fig. 7 is a perspective view of a connection employed.

Referring more particularly to the accompanying drawing the numeral 6 indicates the frame of the motor vehicle having the usual steering apparatus including the connecting rod 7 and the knuckles 8 thereof.

A headlight turning mechanism, which comprises the essential feature of the invention, may be associated either with one or both of the headlights depending upon whether it is desired to turn one or both of the headlights when the steering mechanism of the vehicle is operated and in the present instance there is shown only one of the mechanisms.

The mechanism is shown in what is now believed to be its preferred form which comprises a sleeve 9 disposed in a vertical position and having an angular bracket 10 extending from the upper end thereof and offset from the longitudinal opening of the sleeve, said bracket being employed to secure the sleeve in its proper position to the frame of the machine and having associated therewith a bolt 11 for this purpose. Rotatably mounted in the opening in the sleeve 9 is a vertical spindle 12 having a laterally projecting enlargement 13 at its upper end the lower portion of which rests upon said upper end and said enlargement is provided with a vertical opening 14 for receiving the stem 15 of the lamp bracket 16, said stem being secured in position in the enlargement by means of a nut 17. The lower end of the spindle 12 is projected beyond the lower end of the sleeve and is provided with the oppositely disposed flattened sides 18 from and a portion of said lower end of the spindle reduced and screw threaded to form the shank 19 for a purpose which will presently appear.

A link 20 has one end thereof provided with an opening 21 shaped to receive the lower portion of the spindle 12 which has the flattened sides 18 so that movement of the link will be transmitted to the spindle to rotate the same and in order to secure said end of the link to the spindle a nut 22 is threaded upon the shank 19 and engaged with the under surface of said link. The link or crank arm 20 is directed downwardly and has its other end pivotally mounted, at 23, in the bifurcation 24 formed in one end of the arm 25. The other end of said arm 25 is also provided with a bifurcation 26 disposed at right angles to the first named bifurcation and has pivotally mounted therein one end of a connection 27. The pivoted end 28 of the connection 27 is enlarged and swings about the horizontal pivot 29 while the end 30 of said connection opposite the end 28 is also enlarged and disposed in a horizontal plane and at right angles to the last named end. The under surface of the end 30 is preferably concaved as indicated at 31 to form a recess for receiving the upper portion of the connection rod 7 and the upper surface of said end 30 is provided with a transverse notch 32 in which is engaged a fastener 33 such as a U-bolt which extends on both sides of the rod 7 and which is secured in position by means of the notch 33.

From the foregoing description taken in connection with the accompanying drawing it will be apparent that when the rod 7 is shifted in either direction by the operation of the steering apparatus of the vehicle, the arm 25 will have a similar movement in the same direction imparted thereto and, through the medium of the link 20, it will be apparent that the spindle 12 will be rotated and the headlight or lamp carried in the bracket 16 carried in the desired direction.

What is claimed is:—

In a headlight turning mechanism for vehicles, the combination with the connecting rod of the steering apparatus of the vehicle; of a connection for the steering rod having one end provided in its under surface with a concaved recess for engaging said rod and its upper surface with a transverse notch, a fastener engaged in said notch for securing the connection to the rod, the other end of said connection being disposed in its plane at right angles to the first named end, an arm pivoted to said other end, and a link pivoted to said arm for the connection thereof with the head light turning mechanism.

In testimony whereof, I affix my signature, in the presence of two witnesses.

JULIUS HART.

Witnesses:
W. H. GOWDY,
M. C. EDGINGTON.

Copies of this patent may be obtained for five cents each, by addressing the "Commissioner of Patents, Washington, D. C."